(12) United States Patent
Nimchan et al.

(10) Patent No.: US 10,648,358 B2
(45) Date of Patent: May 12, 2020

(54) SYSTEMS AND METHODS FOR PROTECTING A TURBOMACHINE

(71) Applicants: Dresser-Rand Company, Olean, NY (US); REXA, Inc., West Bridgewater, MA (US)

(72) Inventors: Shannon Nimchan, Richmond, TX (US); John Limmer, Cypress, TX (US); Pedro Lopez, Katy, TX (US); Ken Enos, East Taunton, MA (US)

(73) Assignees: DRESSER-RAND COMPANY, New York, NY (US); REXA, INC., WestBridgewater, MA (US)

( * ) Notice: Subject to any disclaimer, the term of this patent is extended or adjusted under 35 U.S.C. 154(b) by 210 days.

(21) Appl. No.: 15/843,814

(22) Filed: Dec. 15, 2017

(65) Prior Publication Data

US 2018/0171818 A1 Jun. 21, 2018

Related U.S. Application Data

(60) Provisional application No. 62/434,626, filed on Dec. 15, 2016.

(51) Int. Cl.
| | | |
|---|---|---|
| *F01D 17/14* | (2006.01) | |
| *F16K 31/363* | (2006.01) | |
| *F16K 31/122* | (2006.01) | |
| *F15B 1/26* | (2006.01) | |
| *F15B 13/02* | (2006.01) | |
| *F15B 13/06* | (2006.01) | |
| *F15B 11/16* | (2006.01) | |

(52) U.S. Cl.
CPC ........ *F01D 17/145* (2013.01); *F16K 31/1221* (2013.01); *F16K 31/363* (2013.01); *F05D 2220/31* (2013.01); *F05D 2260/57* (2013.01); *F15B 1/26* (2013.01); *F15B 11/16* (2013.01); *F15B 13/024* (2013.01); *F15B 13/06* (2013.01); *F15B 2211/7051* (2013.01)

(58) Field of Classification Search
None
See application file for complete search history.

(56) References Cited

U.S. PATENT DOCUMENTS

| | | | |
|---|---|---|---|
| 3,908,701 A * | 9/1975 | Dawawala | F16K 31/363 137/630.15 |
| 2013/0233423 A1* | 9/2013 | Dietrich | F01D 21/02 137/625.63 |

* cited by examiner

*Primary Examiner* — P. Macade Nichols

(57) ABSTRACT

Systems and methods for protecting a turbomachine may include a trip throttle valve having a throttle valve assembly and a trip valve assembly. The trip valve assembly may include a plurality of trip valves fluidly coupled to a hydraulic cylinder of the throttle valve assembly via a first flow path and a second flow path in parallel with one another. The trip valve assembly may also include a plurality of isolation valves fluidly coupled to the hydraulic cylinder via the first flow path and the second flow path. The plurality of isolation valves may be configured to selectively prevent fluid communication between the plurality of trip valves and the hydraulic cylinder to allow testing of one or more of the plurality of trip valves during operation of the turbomachine.

9 Claims, 6 Drawing Sheets

SYSTEMS AND METHODS FOR PROTECTING A TURBOMACHINE

BACKGROUND

Steam turbines power plants typically utilize a trip throttle valve to control the introduction of high pressure steam to the steam turbine. The trip throttle valve may be electrically coupled to a control system capable of monitoring certain conditions indicative of imminent danger to the steam turbine, e.g., rotor overspeed. When such conditions are met, the control system may send a signal to trip the steam turbine, thereby closing the trip throttle valve and preventing the inflow of the high pressure steam to the steam turbine. In order to ensure that the trip throttle valve is in proper working condition, testing of the trip throttle valve should be carried out on a regular basis. Infrequent testing of the trip throttle valve may result in the accumulation of scale or rust that may affect the ability of the trip throttle valve to properly close after receiving the signal to trip. Accordingly, such a malfunction of the throttle trip valve may result in the inability to safely shutdown the steam turbine in the event of a trip condition.

Traditionally, in order to test the trip throttle valve, the steam turbine is tripped, and thus, taken offline resulting in production and economic losses. Accordingly, such drawbacks have led to methods of testing the trip throttle valve without taking the steam turbine offline. For example, one such method includes utilizing a lockout device to isolate trip components of the trip throttle valve to test the trip components without tripping the steam turbine. However, such a practice may leave the steam turbine unprotected from a potential trip condition arising during testing.

What is needed, therefore, is a trip throttle valve which may be tested during operation of the steam turbine while providing for the safe shutdown of the steam turbine in the event of an occurrence of a trip condition during testing.

SUMMARY

Embodiments of the disclosure may provide a trip throttle valve. The trip throttle valve may include a trip throttle valve inlet configured to receive a flow of process fluid from a process fluid source, and a trip throttle valve outlet configured to fluidly communicate with a turbomachine. The trip throttle valve may also include a throttle valve assembly defining a throttle valve chamber in fluid communication with the trip throttle valve inlet and the trip throttle valve outlet. The throttle valve assembly may be configured to control an amount of the process fluid flowing into the turbomachine. The throttle valve assembly may include a valve seat disposed within the throttle valve chamber, and a valve head displaceable in the throttle valve chamber and configured in an open position to allow the process fluid to flow into the turbomachine and in a closed position to seat in the valve seat to prevent the process fluid from flowing into the turbomachine. The throttle valve assembly may also include a piston connected to the valve head via a valve stem, a biasing member disposed about the valve stem and configured to bias the piston in a first position such that the valve head is seated in the valve seat, a hydraulic cylinder configured to receive the piston and a hydraulic fluid therein, and an actuator assembly fluidly coupled with the hydraulic cylinder. The actuator assembly may be configured to transfer the hydraulic fluid to and from the hydraulic cylinder via a pressure differential across the piston. The trip throttle valve may also include a trip valve assembly configured to selectively remove hydraulic pressure from the hydraulic cylinder. The trip valve assembly may include a plurality of trip valves fluidly coupled to the hydraulic cylinder via a first flow path and a second flow path. The plurality of trip valves may include a first trip valve and a second trip valve arranged in fluid communication with a first pressure relief valve in the first flow path, and a third trip valve and a fourth trip valve arranged in fluid communication with a second pressure relief valve in the second flow path. The first flow path and the second flow path may be in parallel with one another. The trip valve assembly may also include a plurality of isolation valves fluidly coupled to the hydraulic cylinder via the first flow path and the second flow path. The plurality of isolation valves may include a first isolation valve and a second isolation valve arranged in the first flow path and configured to selectively prevent fluid communication between the first trip valve and the second trip valve and the hydraulic cylinder, and a third isolation valve and a fourth isolation valve arranged in the second flow path and configured to selectively prevent fluid communication between the third trip valve and the fourth trip valve and the hydraulic cylinder.

Embodiments of the disclosure may further provide a protection system for a turbomachine. The protection system may include a trip throttle valve. The trip throttle valve may include a throttle valve assembly having a longitudinal axis and being configured to regulate a flow of process fluid into the turbomachine. The throttle valve assembly may include a piston disposed within a hydraulic cylinder and configured to be axially displaced in the hydraulic cylinder based on an amount of hydraulic fluid provided to the hydraulic cylinder. The trip throttle valve may also include a trip valve assembly fluidly coupled to the hydraulic cylinder via a first flowpath and a second flowpath, the first and second flowpath being in parallel with one another. The trip valve assembly may include a first isolation valve and a second isolation valve disposed in the first flowpath. Each of the first isolation valve and the second isolation valve may be configured to selectively prevent fluid communication between the first flowpath of the trip valve assembly and the hydraulic cylinder. The trip valve assembly may also include a third isolation valve and a fourth isolation valve disposed in the second flowpath. Each of the third isolation valve and a fourth isolation valve may be configured to selectively prevent fluid communication between the second flowpath of the trip valve assembly and the hydraulic cylinder. The trip valve assembly may further include a first trip valve disposed in the first flowpath and interposed between the first isolation valve and the second isolation valve. The trip valve assembly may further include a second trip valve disposed in the second flowpath and interposed between the third isolation valve and the fourth isolation valve. The protection system may also include a control system configured to monitor an operation of the turbomachine for a trip condition during a testing of the trip valve assembly. The control system may include a plurality of sensors communicatively coupled to the turbomachine and configured to detect one or more operating parameters of the turbomachine. The control system may also include a first controller communicatively coupled to the plurality of sensors. The first controller may include at least one processor configured to receive at least one signal corresponding to at least one detected operating parameter of the turbomachine. The control system may also include a second controller communicatively coupled to the first controller and the throttle valve assembly. The second controller may include at least one processor configured to transmit at least one instruction to the throttle valve assembly to cause the piston to be axially displaced in the hydraulic cylinder along the longitudinal axis based on information received from the first controller.

Embodiments of the disclosure may further provide a method for testing a trip throttle valve during operation of a turbomachine. The method may include flowing a process fluid through the trip throttle valve and into an inlet of the turbomachine. The method may also include closing a first isolation valve and retaining a second isolation valve in an open position, where the first isolation valve and the second isolation valve are disposed in a first flowpath fluidly coupling a trip valve assembly and a hydraulic cylinder of a the trip throttle valve. The method may further include retaining in an opened position a third isolation valve and a fourth isolation valve disposed in a second flowpath fluidly coupling the trip valve assembly and the hydraulic cylinder of the trip throttle valve. The first flowpath and the second flowpath may be in parallel. The method may also include opening a first trip valve disposed in the first flowpath and interposed between the first isolation valve and the second isolation valve, such that the operation of the turbomachine is maintained. The method may further include detecting a pressure in the first flowpath via a pressure sensor, the detected pressure indicative of an operating condition of the first trip valve.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
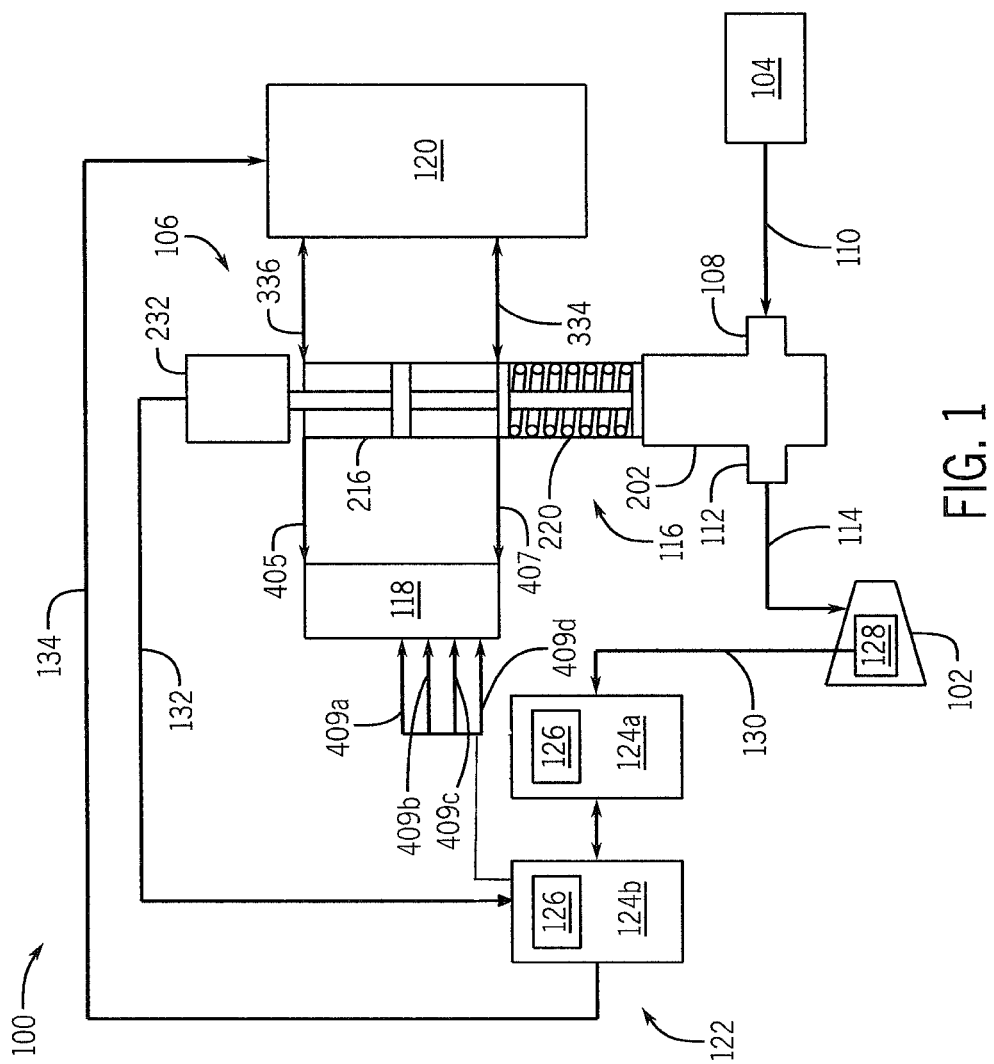
FIG. 1 illustrates a schematic of an exemplary system for protecting one or more components of a turbomachine, according to one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Systems and methods disclosed herein may protect one or more components of a turbomachine from damage that may occur in the event of certain conditions, such as, for example, low lubrication oil pressure, high rotor vibrations, rotor overspeed, and high bearing temperatures. As such conditions may indicate imminent danger to the turbomachine, the systems and methods disclosed herein may protect the turbomachine from damage by tripping, or shutting down, the turbomachine on an emergency basis. To ensure that the turbomachine may be reliably shutdown on an emergency basis, the systems and methods as disclosed herein allow for the testing of the components involved in the shutdown of the turbomachine during the ordinary operation thereof, thereby avoiding taking the turbomachine offline during the testing process and allowing for the continued operation thereof while maintaining protection of the turbomachine in the event of a trip condition. By doing so, the disruption or stoppage of the operation of the turbomachine during testing of the trip throttle valve may be avoided.

Turning now to the Figures, FIG. 1 illustrates a schematic of an exemplary system 100 for protecting one or more components of a turbomachine 102, according to one or more embodiments of the disclosure. In one or more embodiments, the one or more components may be or include a rotor (not shown) and/or rotary components thereof. The turbomachine 102 may be a steam turbine configured to extract energy from a flow of steam provided thereto and to drive other process components (not shown), such as, for example, a generator, a compressor, or a pump.

Accordingly, the steam turbine may be part of a steam turbine power plant further including a steam generator 104, e.g., a boiler, configured to convert feed water to the steam provided to the steam turbine. The steam turbine power plant may further include a condenser (not shown) configured to cool the steam exiting the steam turbine. In an embodiment in which the steam turbine drives a generator, the generator may be electrically coupled to and configured to supply power to an electrical grid or to other components (e.g., actuators, control systems, and sensors) of the steam turbine power plant.

Figure 2:
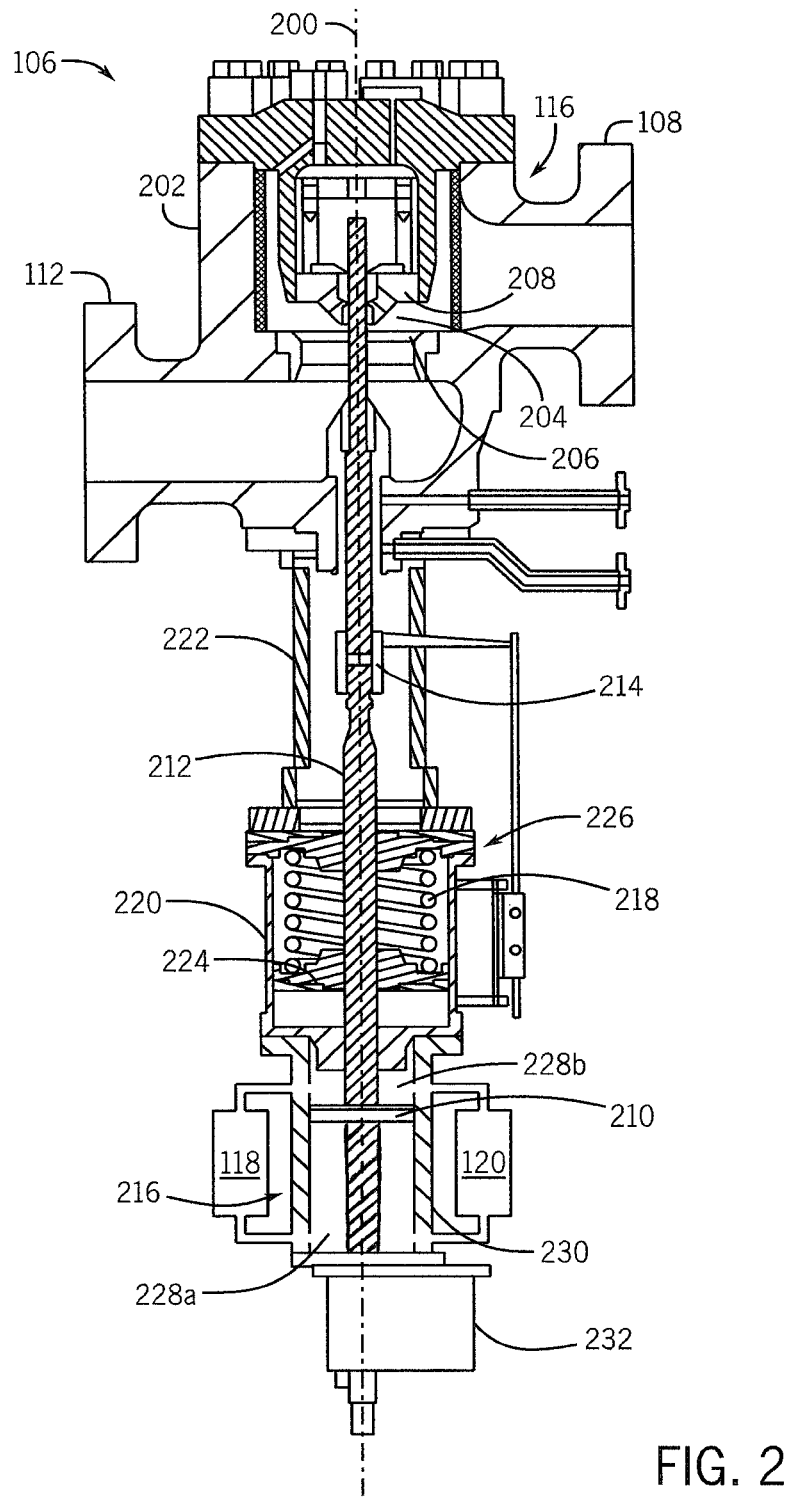
FIG. 2 illustrates a cross-sectional view of an exemplary trip throttle valve, according to one or more embodiments of the disclosure.

As illustrated in FIG. 1, the system 100 may include a trip throttle valve 106 having a trip throttle valve inlet 108 fluidly coupled to the steam generator 104 via process piping 110, and a trip throttle valve outlet 112 fluidly coupled to an inlet of the turbomachine via process piping 114. Referring now to FIG. 2 with continued reference to FIG. 1, FIG. 2 illustrates an exemplary cross-sectional view of the trip throttle valve 106, according to one or more embodiments of the disclosure. The trip throttle valve 106 may include a throttle valve assembly 116 and a trip valve assembly 118. The flow of a process fluid, e.g., steam, to the turbomachine 102 may be regulated by the throttle valve assembly 116 during ordinary operation of the turbomachine 102; thus, in the exemplary system 100, the throttle valve assembly 116 may be fluidly coupled to and disposed downstream of a process fluid source, e.g., the steam generator 104, and upstream of the inlet of the turbomachine 102. Those of ordinary skill in the art will appreciate that one or more process components may be interposed between the trip throttle valve 106 and the process fluid source.

As illustrated most clearly in FIG. 2, the throttle valve assembly 116 may include a longitudinal axis 200 and a valve body 202 defining a throttle valve chamber 204 in fluid communication with the trip throttle valve inlet 108 and the trip throttle valve outlet 112, thereby selectively providing a flowpath from the steam generator 104, through the trip throttle valve 106, and to the turbomachine 102. The throttle valve assembly 116 may include a valve seat 206 disposed within the throttle valve chamber 204, and a valve head 208 axially displaceable in the throttle valve chamber 204 along the longitudinal axis 200 and configured in an open position (as shown in FIG. 2) to allow the process fluid to flow into the turbomachine 102 and in a closed position to seat in the valve seat 206 to prevent the process fluid from flowing through the throttle valve chamber 204 and into the turbomachine 102.

The throttle valve assembly 116 may further include a piston 210 and a valve stem 212 interconnecting the valve head 208 and the piston 210. The valve stem 212 may be a single, unitary component extending from the valve head 208 to the piston 210, or in other embodiments, the valve stem 212 may be formed from multiple segments coupled with one another via one or more couplings 214. The piston 210 may be slidably disposed in a hydraulic cylinder 216 of the throttle valve assembly 116 and biased in a shutdown position by a biasing member 218, illustrated as a spring in FIG. 2, to thereby close the trip throttle valve 106, or urged in an opposing direction along the longitudinal axis 200 of the throttle valve assembly 116 to open the trip throttle valve 106. The throttling, e.g., the amount the trip throttle valve 106 is opened, may depend on a pressure differential across the piston 210.

The biasing member 218 may be disposed in a spring housing 220 of the throttle valve assembly 116 interconnecting the valve body 202 and the hydraulic cylinder 216. As illustrated in FIG. 2, the spring housing 220 may be coupled to an intermediary housing 222 disposed between the spring housing 220 and the valve body 202. The intermediary housing 222 may house one or more couplings 214 of the valve stem 212 which may be utilized to provide valve position information. In some embodiments, the spring housing 220 may be directly coupled to the valve body 202. In other embodiments, the intermediary housing 222 may be part of or integral with the valve body 202, as shown in FIG. 1.

In one or more embodiments, the biasing member 218 may be disposed about and concentric with the valve stem 212 in the spring housing 220, as the valve stem 212 extends from the valve body 202 through the spring housing 220 and into the hydraulic cylinder 216. A first end portion of the biasing member 218 may be disposed on a retaining member 224 illustrated as a spring perch in FIG. 2 and coupled to or integral with the valve stem 212 within the spring housing 220. A second end portion of the biasing member 218 may be disposed against an end portion 226 of the spring housing 220 axially adjacent the intermediary housing 222. Accordingly, the biasing member 218 may be compressed by the travel of the retaining member 224 in an axial direction toward the valve seat 206, as shown in FIG. 2.

The hydraulic cylinder 216 may define a cylinder chamber 228a, 228b in which the piston 210 may be slidably displaced along the longitudinal axis 200 of the throttle valve assembly 116. The cylinder chamber 228a, 228b may be configured to receive, retain, and/or discharge hydraulic fluid therefrom. In one or more embodiments, the hydraulic fluid may be oil. In another embodiment, the hydraulic fluid may be petroleum or water-based oils. In another embodiment, the hydraulic fluid may be petroleum or water-based hydraulic fluids. As disposed in the hydraulic cylinder 216, the piston 210 may separate the cylinder chamber 228a, 228b into two sealed cylinder chambers sections axially opposing one another on opposing sides of the piston 210. As shown in FIG. 2, the piston 210 may separate the hydraulic cylinder 228a, 228b into a first cylinder chamber section 228a and a second cylinder chamber section 228b, where the volume of each of the first and second cylinder chamber sections 228a, 228b may be dependent on the axial position of the piston 210 along the longitudinal axis 200 of the throttle valve assembly 116. The hydraulic fluid may be supplied from and/or returned to an actuator assembly 120 of the throttle valve assembly 116. A housing 230 of the hydraulic cylinder 216 may define a pair of hydraulic fluid orifices 300a, 300b (most clearly seen in FIG. 3) at respective ends 302, 304 (most clearly seen in FIG. 3) of the hydraulic cylinder 216. Accordingly, the first cylinder chamber section 228a and the second cylinder chamber section 228b may fluidly communicate with the actuator assembly 120 via the respective hydraulic fluid orifices 300a, 300b.

Figure 3:
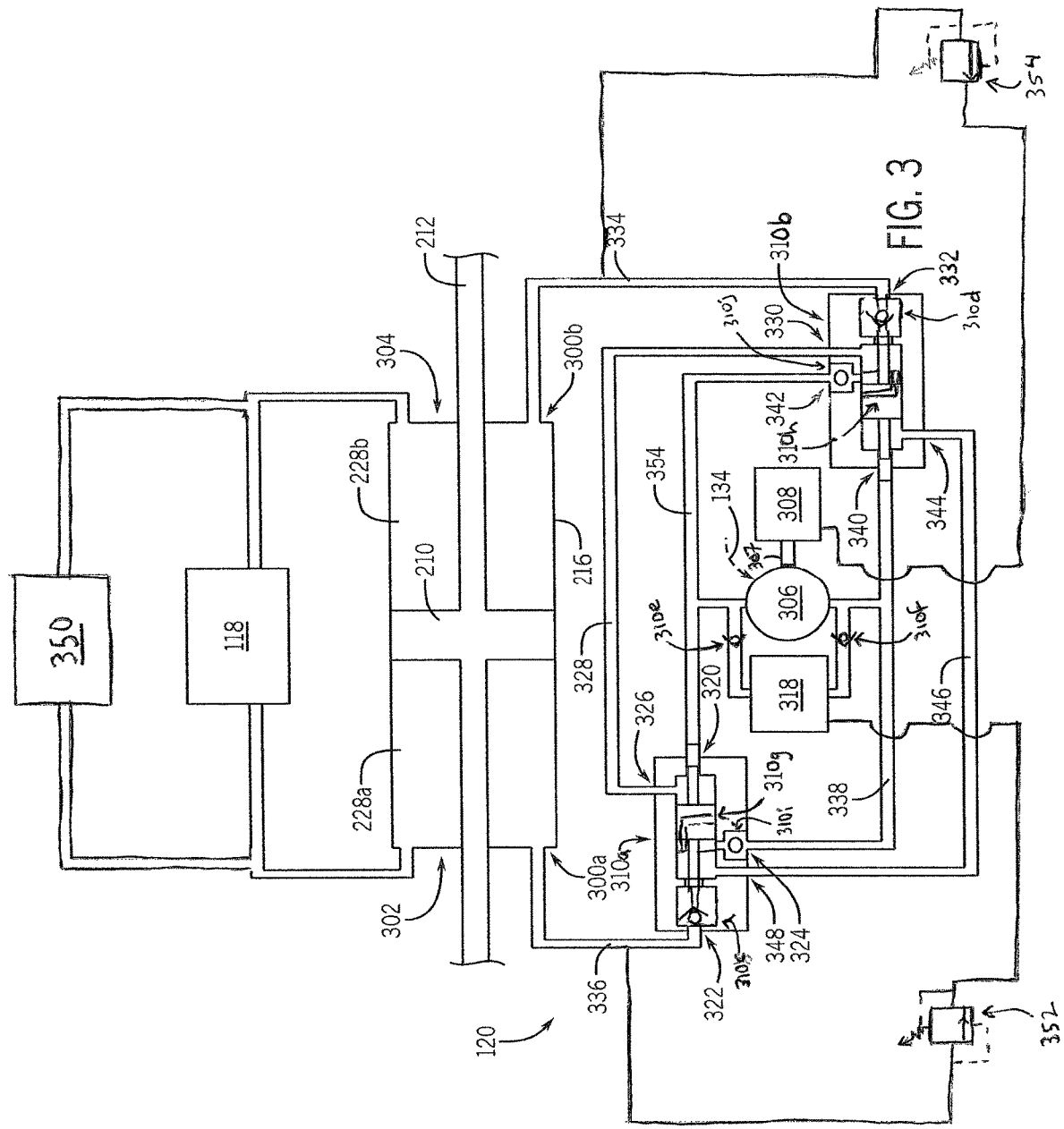
FIG. 3 illustrates a schematic of an exemplary actuator assembly, according to one or more embodiments of the disclosure.

Referring now to FIG. 3 with continued reference to FIGS. 1 and 2, FIG. 3 illustrates an exemplary schematic of the actuator assembly 120, according to one or more embodiments of the disclosure. The actuator assembly 120 may be configured to regulate the axial position of the piston 210 in the cylinder chamber 228a, 228b via the amount of hydraulic fluid supplied to each of the first and second cylinder chamber sections 228a, 228b. To that end, the actuator assembly 120 may include a pump 306 driven by a driver 308. The pump 306 may be a reversible hydraulic pump capable of supplying hydraulic fluid to each of the first and second cylinder chamber sections 228a, 228b and thus may have an alternating suction side and discharge side depending on the operation thereof. Accordingly, the pump 306 may be a positive displacement gear pump mounted about a rotary shaft 307 and configured to rotate in either direction. In one or more embodiments, the driver 308 may be a motor and more specifically may be an electric motor, such as a permanent magnet motor, and may include a stator (not shown) and a rotor (not shown). It will be appreciated, however, that other embodiments may employ other types of electric motors including, but not limited to, synchronous motors, induction motors, and brushed DC motors. The pump 306 may be configured to circulate the hydraulic fluid to and from the first and second cylinder chamber sections 228a, 228b in a closed-loop configuration as shown in FIG. 3. By implanting a closed-loop configuration, the hydraulic fluid in the actuator assembly 120 may be isolated from the environment and immune to degradation as a result of exposure to moisture and other atmospheric elements.

The actuator assembly 120 may further include a plurality of valves 310a-j configured to regulate the flow of the hydraulic fluid to the first and second cylinder chamber sections 228a, 228b dependent on the direction of operation of the pump 306. The plurality of valves 310a-h may include a flow match valve 310a selectively fluidly coupling the pump 306 to the first cylinder chamber section 228a, and a flow match valve 310b selectively fluidly coupling the pump 306 to the second cylinder chamber section 228b. In addition, in one or more embodiments, the plurality of valves 310a-h may include a check valve 310c selectively fluidly coupling the pump 306 to the first cylinder chamber section 228a, and a check valve 310d selectively fluidly coupling the pump 306 to the second cylinder chamber section 228b. In one or more embodiments, either of the flow match valves 310a, 310b may include one or more spool valves, cross port pilot-to-open check valves, and/or cross port counterbalance valves. In one or more embodiments, the actuator assembly 120 may also include a reservoir 318 configured to store additional hydraulic fluid to supplement the actuator assembly 120 with additional hydraulic fluid as needed based on thermal expansion. The pump 306 may be in fluid communication with the reservoir 318 via check valves 310e and 310f and may draw the additional hydraulic fluid into the suction side thereof as necessitated by the thermal expansion.

The system 100 may further include a control system 122 configured to monitor and control the operation of the turbomachine 102. In particular, the control system 122 may be configured to regulate the amount of process fluid flowing into the turbomachine 102 via the trip throttle valve 106. Accordingly, as disclosed in the present disclosure, the trip throttle valve 106 may be referred to as an electro-hydraulic trip throttle valve. The control system 122 may include at least one controller (two shown 124a, 124b) including one or more processors 126 configured to provide the processing capability to execute the operating system, programs, interfaces, and any other functions of the control system 122, one or more microprocessors and/or related chip sets, a computer/machine readable memory capable of storing date, program information, or other executable instructions thereon, general purpose microprocessors, special purpose microprocessors, or a combination thereof, on board memory for caching purposes, instruction set processors, and so forth. Each processor 126 may operate independently or may communicate with at least one other processor 126. In one or more embodiments, the control system 122 may include a plurality of controllers 124a, 124b communicatively coupled with one another and the turbomachine 102, where each controller 124a, 124b may include one or more processors 126.

As shown in FIG. 1, the control system 122 may further include a plurality of sensors 128 communicatively coupled to one or more of the processors 126 of the controller 124a and configured to detect one or more operating parameters of the turbomachine 102. In one or more embodiments, at least one of the sensors 128 may be a toothed wheel or gear to sense rotor speed of the turbomachine 102. In other embodiments, the sensors 128 may be or include temperature sensors, pressure sensors, flow rate sensors, or any other sensors configured to measure an operating parameter of the turbomachine 102, the process fluid flowing therethrough, or parameters from other components in the system 100, such as temperatures, pressures, rotation speed, frequency, voltage, etc. In addition, the plurality of sensors 128 may include a position feedback sensor 232 configured to determine the position of the piston 210 via the position of the valve stem 212. The sensors 128 may be wirelessly connected or may be connected via cable 130 to the controller 124a to transmit signals corresponding to the detected operating parameters to the controller 124a for processing. The position feedback sensor 232 may be wirelessly connected or may be connected via cable 132 to the controller 124b and relayed to the controller 124a to transmit signals corresponding to the detected position of the piston 210 for processing. The controller 124a may process, via the one or more processors 126, the received signals corresponding to the detected position of the piston 210 and/or operating parameters of the turbomachine 102 received via the controller 124a and may transmit corresponding signals to the controller 124b for processing. The controller 124b may transmit corresponding signals to the actuator assembly 120 responsive to the desired piston positon 210 and/or operating parameters in view of the received operating parameters from the sensors 128 and 232 and the controller 124a. The signals may be provided to the pump 306 via cable 134 to pressurize one of the flow match valves 310a, 310b to maintain or axially displace the piston 210 accordingly.

Turning now to an exemplary method of operating the trip throttle valve 106 to regulate the flow of process fluid to the turbomachine 102 during the ordinary operation of the turbomachine 102, one or more of the sensors 128 are communicatively coupled to the turbomachine 102 and detect one or more operating parameters thereof, such as the rotor speed of the turbomachine 102. The detected operating parameter(s) is/are transmitted via the one or more sensors 128 to the controller 124a, where the operating parameters are processed via the one or more processors 126 and a determination is made to increase the flowrate of the process fluid entering the turbomachine 102, decrease the flowrate of the process fluid entering the turbomachine 102, or maintain the flowrate of the process fluid entering the turbomachine 102. A signal including the appropriate instructions is sent to the controller 124b, which processes the signal and relays a corresponding signal to the pump 306 of the actuator assembly 120. In some embodiments, the signal or another signal is sent to the driver 308 in addition to the pump 306. The driver 308 is activated to drive the pump 306 in order to pressurize either the first cylinder chamber section 228a or the second cylinder chamber section 228b dependent on the instruction(s) received by the pump 306 from the controller 124b.

In the event of an instruction to decrease the flowrate of process fluid entering the turbomachine 102, the pump 306 is activated to circulate hydraulic fluid into the second cylinder chamber section 228b via hydraulic fluid orifice 300b by pressurizing port 320. Accordingly, the flow match valve 310a becomes unbalanced by the pressure differential and is axially displaced, thereby lifting the check valve 310c and opening port 322 to port 324, and port 320 to port 326. The pressurized hydraulic fluid may flow through port 326 and conduit 328 to port 330 and port 332 to the second cylinder chamber section 228b via conduit 334. As the actuator assembly 120 is a closed loop configuration, the same amount of hydraulic fluid entering the second cylinder chamber section 228b is removed from the first cylinder chamber section 228a. Thus, the same amount of hydraulic fluid is removed from the first cylinder chamber section 228a via hydraulic fluid orifice 300a and the piston 210 moves axially toward the end 302 of the hydraulic cylinder 216. As the valve head 208 is interconnected with the piston 210 via the valve stem 212, the valve head 208 is moved axially toward the valve seat 206, thereby decreasing the flowpath for the process fluid to flow into the turbomachine 102, and thus, decreasing the flow of process fluid into the turbomachine 102. The hydraulic fluid exiting the first cylinder chamber section 228a via the hydraulic fluid orifice 300a flows via conduit 336 through the port 322 and the check valve 310i and into the port 324 and enters the suction side of the pump 306 via conduit 338.

In the event of an instruction to increase the flowrate of process fluid entering the turbomachine 102, the pump 306 is activated to circulate hydraulic fluid into the first cylinder chamber section 228a via hydraulic fluid orifice 300a by pressurizing pressurize port 340. Accordingly, the flow match valve 310b becomes unbalanced by the pressure differential and is axially displaced, thereby lifting the check valve 310d and thereby opening the port 332 to port 342, and the port 340 to port 344. The pressurized hydraulic fluid may flow through port 344 and conduit 346 to port 348 and port 322 to the first cylinder chamber section 228a via conduit 336. As the actuator assembly 120 is a closed loop configuration, the same amount of hydraulic fluid entering the first cylinder chamber section 228a is removed from the second cylinder chamber section 228b. Thus, the same amount of hydraulic fluid is removed from the second cylinder chamber section 228b via hydraulic fluid orifice 300b and the piston 210 moves axially toward the end 304 of the hydraulic cylinder 216. As the valve head 208 is interconnected with the piston 210 via the valve stem 212, the valve head 208 is moved axially away the valve seat 206, thereby increasing the flowpath for the process fluid to flow into the turbomachine 102, and thus, increasing the flow of process fluid into the turbomachine 102. The hydraulic fluid exiting the second cylinder chamber section 228b via the hydraulic fluid orifice 300b flows via conduit 334 through the port 332 and the check valve 310j and into the port 342 and enters the suction side of the pump 306 via conduit 354.

In the event of an instruction to maintain the flowrate of the process fluid entering the turbomachine 102, the pump 306 is deactivated and both check valves 310c and 310d close. The hydraulic fluid may thus be locked within the hydraulic cylinder 216, thereby maintaining the pressure differential across the piston 210 such that the piston 210 remains in a fixed position. Accordingly, the valve head 208 remains in a fixed position, thereby maintaining the current flowrate. When locked in place, the hydraulic cylinder 216 and hydraulic fluid may be subject to expansion due to thermal expansion. Accordingly, the actuator assembly may further include relief valves 352 and 354 to protect the actuator assembly from overpressure generated by thermal expansion. As illustrated in FIG. 3, the pressure relief valves 352 and 354 may be fluidly coupled to the reservoir 318 to return any bled-off hydraulic fluid thereto. As may be understood by those of skill in the art, the pressure differential across the piston 210 may move the piston 210 axially toward either end 302, 304 of the hydraulic cylinder 216. Such movement of the piston 210 causes the attached valve head 208 to be axially displaced in relation to the valve seat 206, thereby throttling the trip throttle valve 106.

In one or more embodiments, the trip throttle valve 106 may further include a solenoid valve 350 fluidly coupled with the hydraulic cylinder 216 and configured to exercise or test the trip throttle valve 106 by actuating the trip throttle valve 106 to a set point (for example, seventy-five percent open) and then returning the trip throttle valve 106 to a fully-opened position to ensure that the trip throttle valve 106 is functioning and has not frozen in place. To that end, the solenoid valve 350 may be cross ported across the hydraulic cylinder 216 as shown in FIG. 3. The solenoid valve 350 may be communicatively coupled to the controller 124a and/or controller 124b. The controller 124b may be programmed to periodically instruct the solenoid valve 350 to actuate the trip throttle valve 106 to ensure the ordinary operation thereof. In an exemplary operation thereof, the controller 124b transmits an instruction to the solenoid valve 350, which allows the trip throttle valve 106 to be moved to a predetermined position and then returned to the fully-opened position, thereby validating that the trip throttle valve 106 is operational and is not frozen in place.

Figure 4:
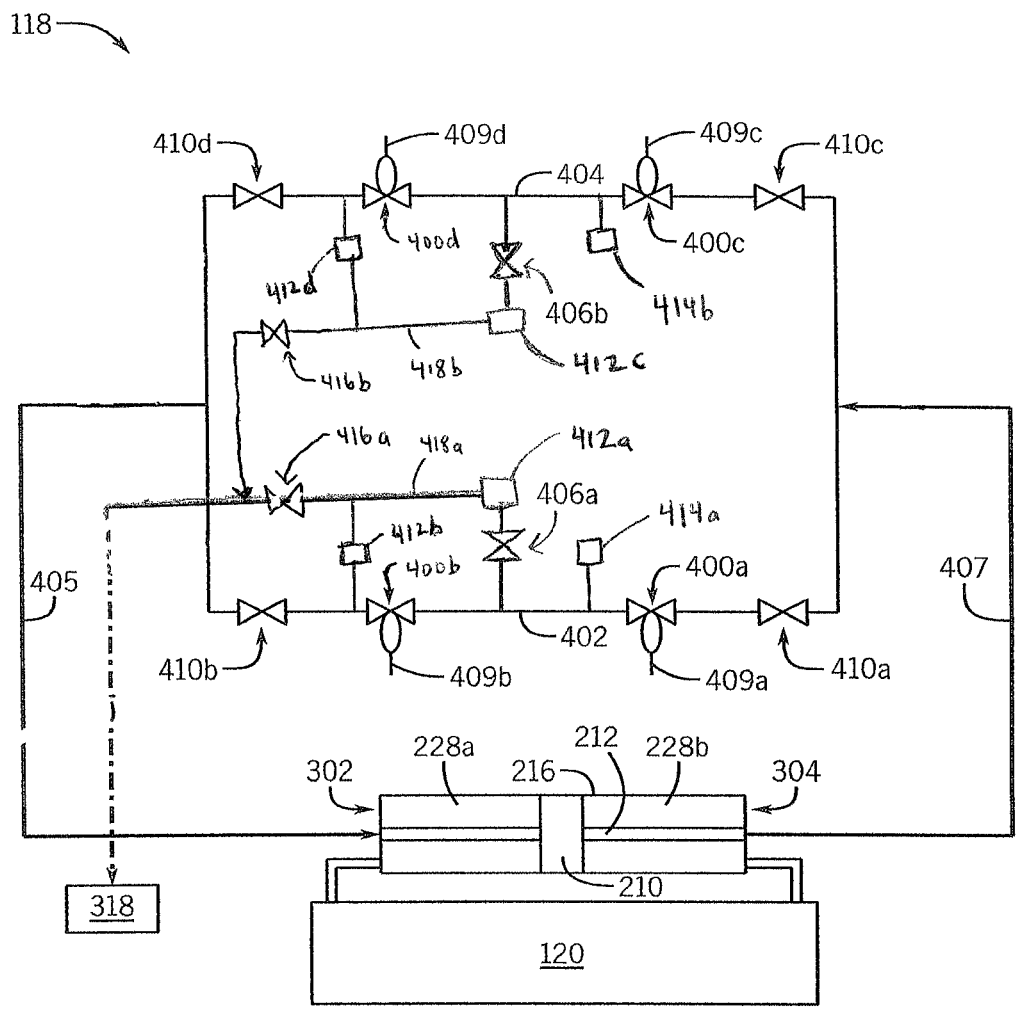
FIG. 4 illustrates a schematic of an exemplary trip valve assembly, according to one or more embodiments of the disclosure.

As noted above, the system 100 may protect the turbomachine 102 from damage by shutting the turbomachine 102 down on an emergency basis. To that end, as shown in FIG. 1 and as noted above, the trip throttle valve 106 may further include the trip valve assembly 118. The trip valve assembly 118 may be configured to trip or shutdown the turbomachine 102 in the event one or more of the sensors 128 detects an operating parameter of the turbomachine 102 indicative of imminent danger to the operability of the turbomachine 102. Referring now to FIG. 4 with continued reference to FIGS. 1-3, FIG. 4 illustrates an exemplary schematic of the trip valve assembly 118, according to one or more embodiments of the disclosure. The trip valve assembly 118 may include a plurality of trip valves 400a-d fluidly coupled to the hydraulic cylinder 216 via trip flowpaths 402 and 404 and conduits 405 and 407. In one or more embodiments, one or more of the trip valves 400a-d may be solenoids. In other embodiments, each of the trip valves 400a-d may be a solenoid. As shown in FIG. 4, the plurality of trip valves 400a-d may include a trip valve 400a and a trip valve 400b arranged in fluid communication with one another in the flowpath 402, and a trip valve 400c and a trip valve 400d arranged in fluid communication with one another in the flowpath 404. The flowpath 402 and the flowpath 404 may be in parallel with one another. Each of the trip valves 400a-d may be communicatively coupled to the controller 124b via respective lines 409a-d and energized in a closed position during ordinary operation of the turbomachine 102.

As arranged in the system 100, the trip valves 400a-d may be energized in a closed position during ordinary operating conditions of the turbomachine 102. In the event of the detection of a fault parameter, i.e., a parameter indicative of imminent danger to the turbomachine 102, by the one or more sensors 128, the controller 124b may transmit a fault signal to the plurality of trip valves 400a-d via lines 409a-d to de-energize the trip valves 400a-d. In the event a fault signal is transmitted to the trip valves 400a-d, the trip valves 400a-d may be deenergized and opened to fluidly couple the first cylinder chamber section 228a and the second cylinder chamber section 228b, thereby allowing the biasing member 218 to force the piston 210 toward the end 302 of the hydraulic cylinder 216, thereby seating the valve head 208 in the valve seat 206 and shutting off the flow of the process fluid into the turbomachine 102 and thus shutting down the operation of the turbomachine 102. As arranged, the trip throttle valve 106 may trip in 0.3 seconds or less, and thus meets API 612 industrial standards.

As disclosed above, the system 100 allows for the testing of the emergency shutdown of the turbomachine 102 during the ordinary operation thereof, thereby avoiding taking the turbomachine 102 offline during the testing process and allowing for the continued operation thereof while maintaining protection of the turbomachine 102 in the event of a trip condition. To that end, the trip valve assembly 118 may further include a plurality of isolation valves 410a-d fluidly coupled to the hydraulic cylinder 216 via the flowpaths 402 and 404 and conduits 405 and 407. As arranged, the plurality of isolation valves 410a-d are configured to isolate either of the flowpaths 402, 404 to allow for testing of the trip valves 400a, 400b or 400c, 400d in the associated flowpath 402 or 404 while allowing the trip valves 400a, 400b or 400c, 400d in the other flowpath 402 or 404 the ability to trip as needed during continued operation of the turbomachine 102, thus protecting the turbomachine 102 from damage. Accordingly, the turbomachine 102 may be maintained in service during the testing of the trip valve assembly 118 without being susceptible to damage if a trip condition were to occur during testing of the trip valve assembly 118.

In one or more embodiments, one or more of the isolation valves 410a-d may be manually operated valves. In another embodiment, one or more of the isolation valves 410a-d may be remotely-operated valves. In one or more embodiments, each of the isolation valves 410a-d may be a ball valve; however, other valves such as poppet valves, gate valves, or the like may be utilized without departing from the scope of this disclosure. The plurality of isolation valves 410a-d may include two isolation valves, isolation valve 410a and isolation valve 410b, arranged in the flowpath 402 and configured to prevent fluid communication between trip valves 400a, 400b and the hydraulic cylinder 216. The plurality of isolation valves 410a-d may also include two isolation valves, isolation valve 410c and isolation valve 410d, arranged in the flowpath 404 and configured to prevent fluid communication between the trip valves 400c, 400d and the hydraulic cylinder 216.

As shown in FIG. 4, each pair of isolation valves 410a-d in the respective flowpath 402, 404 may be disposed therein such that the respective pair of trip valves 400a-d may be selectively prevented from fluidly communicating with the hydraulic cylinder 216 via conduits 405 and 407. Thus, for example, at least one of the isolation valves 410a, 410b in the flowpath 402 may be closed thereby allowing the trip valves 400a, 400b in the flowpath 402 to open during testing without shutting down the turbomachine 102. In addition, the other isolation valves 410c, 410d in the flowpath 404 may remain open so that the other set of trip valves 400c, 400d may be fluidly coupled to the hydraulic cylinder 216 via conduits 405 and 407 during testing to trip as needed in the event of a trip condition.

The trip valve assembly 118 may further include a plurality of pressure relief valves 406a, 406b, each pressure relief valve 406a, 406b fluidly coupling the respective flowpaths 402, 404 with the reservoir 318 and configured to control the respective pressures in the flowpaths 402, 404 during testing of the trip valves 400a-d. Each of the pressure relief valves 406a, 406b may be fluidly coupled to respective flow control orifices 412a, 412b. In addition, the trip valve assembly 118 may further include additional flow control orifices 412b and 412d fluidly coupled to the respective flowpaths 402, 404 and the reservoir 318. The flow control orifices 412a-d may be configured to reduce the flow of the hydraulic fluid exiting the trip valve assembly 118 and minimizing movement of the piston 210 during the testing process. Each of the flow control orifices 412a-d may be fluidly coupled to a respective filter (not shown) to reduce clogging of the flow control orifices 412a-d.

The trip valve assembly 118 may further include a plurality of sensors 414a, 414b. Each of the sensors 414a, 414b may be pressure transducers and may be configured to validate that the trip valves 400a-d have changed state (i.e., opened or closed) and are functioning properly. The trip valve assembly 118 may also include isolation valves 416a and 416b capable of isolating respective flow lines 418a and 418b from the reservoir 318. Closing isolation valves 416a, 410a, and 410b may isolate all components located in the flowpath 402 to thereby allow for the removal and replacement of any trip valve assembly components (e.g., malfunctioning trip valves 400a-d) in the flowpath 402 without interrupting operation of the turbomachine 102 or compromising the trip capability. Likewise, closing isolation valves 416b, 410c and 410d isolate all components located in the flow path 404 to thereby allow for the removal and replacement of any trip valve assembly components (e.g., malfunctioning trip valves 400c-d) in the flow path 404 without interrupting operation of the turbomachine 102 or compromising the trip capability.

Figure 5:
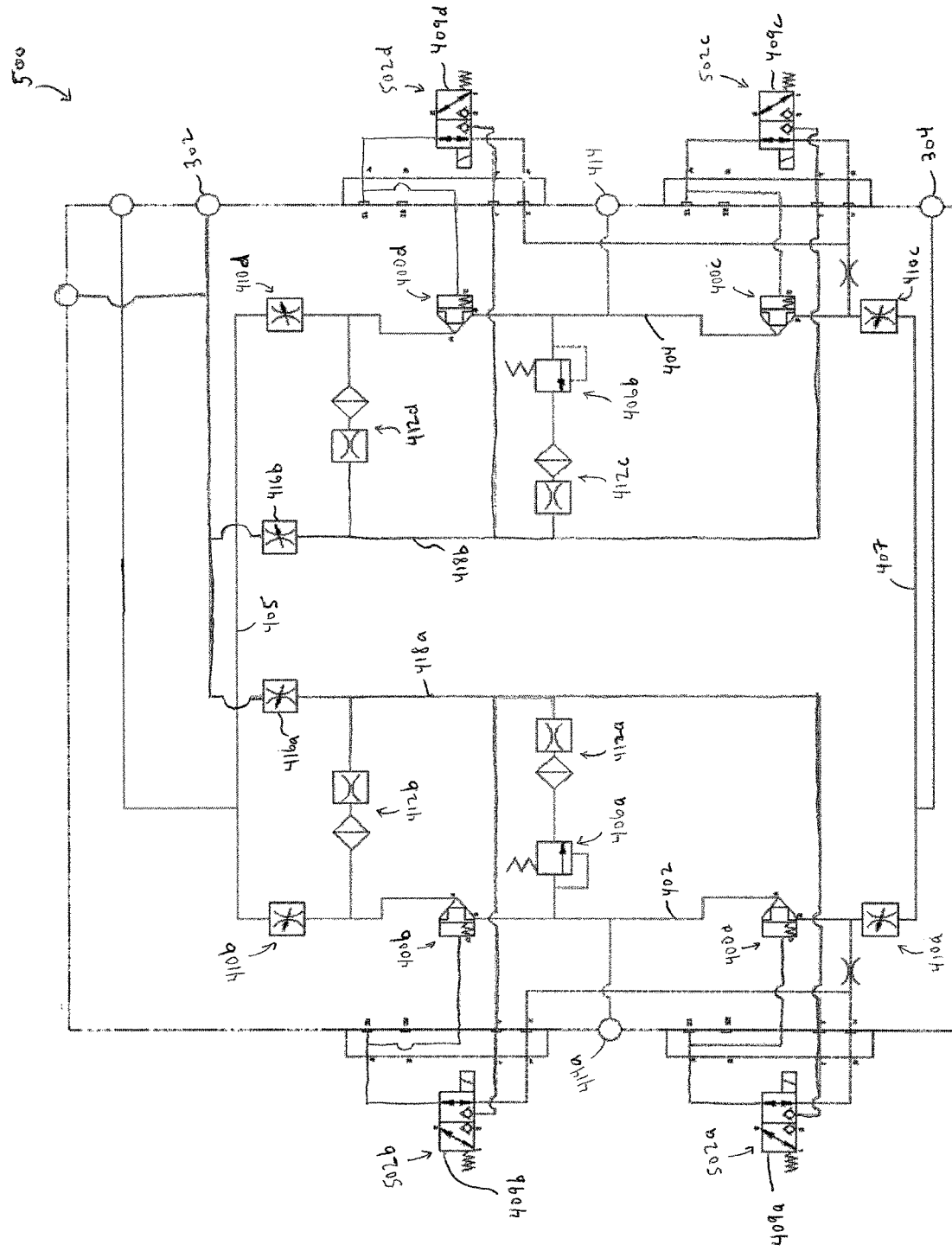
FIG. 5 illustrates a schematic of another exemplary trip valve assembly, according to one or more embodiments of the disclosure.

Referring now to FIG. 5, illustrates a schematic of another exemplary trip valve assembly 500, according to one or more embodiments of the disclosure. The trip valve assembly 500 may be similar in some respects to the trip valve assembly 118 described above and thus may be best understood with reference to FIGS. 1-4, where like numerals designate like components and will not be described again in detail. As shown in FIG. 5, the trip valve assembly 500 may further include a two-position, three-way solenoid valves 502a-d, each two-position, three-way solenoid valve 502a-d fluidly coupled with a respective trip valve 400a-d. In the embodiment of FIG. 5, each trip valve 400a-d is a pilot to close check valve. Each of the two-position, three-way solenoid valves 502a-d may be fluidly coupled with the reservoir 318 via line 418a and line 418b. The actuation of each of the trip valves 400a-d may be controlled by the operation of the respective two-position, three-way solenoid valves 502a-d, thereby permitting testing and operation of the trip throttle valve 106 in larger flowrate turbomachines 102.

Turning now to an exemplary method for testing the trip throttle valve 106 during operation of the turbomachine 102, it will be appreciated that either pair of the trip valves 400a, 400b or 400c, 400d may be tested. For the sake of brevity, the method of testing trip valves 400c, 400d will be discussed below; however, the method of testing trip valves 400a, 400b may be carried out in a similar manner. The method may include flowing a process fluid through the trip throttle valve 106 and into an inlet of the turbomachine 102. In the flowpath 404, the isolation valve 410d is closed and the other isolation valve 410c in the flowpath 404 is retained in an open position. In the flowpath 402, the isolation valves 410a and 410b are retained in an open position. The trip valve 400c is de-energized and thus opened. A pressure is detected in sensor 414b and compared to a pressure value indicative of the trip valve 400c being opened. If the detected pressure is indicative of the trip valve 400d being opened, the trip valve 400c is energized and thus closed. A pressure is detected in sensor 414b and compared to a pressure value indicative of the trip valve 400c being closed.

If the detected pressure is indicative of the trip valve 400c being closed, the trip valve 400d is de-energized and thus opened. A pressure is detected in sensor 414b and compared to a pressure value indicative of the trip valve 400d being opened. If the detected pressure is indicative of the trip valve 400d being opened, the trip valve 400d is energized and thus closed and the trip valve 400c is de-energized again and thus re-opened. A pressure is detected in sensor 414b and compared to a pressure value indicative of the trip valve 400c being re-opened. If the detected pressure is indicative of the trip valve 400c being re-opened, the trip valve 400c is energized and thus closed. A pressure is detected in sensor 414b and compared to a pressure value indicative of the trip valve 400c being closed. If the detected pressure is indicative of the trip valve 400c being closed, it is determined that the trip valves 400c, 400d are in good working condition and testing may be carried out on trip valves 400a, 400b if desired.

Figure 6:
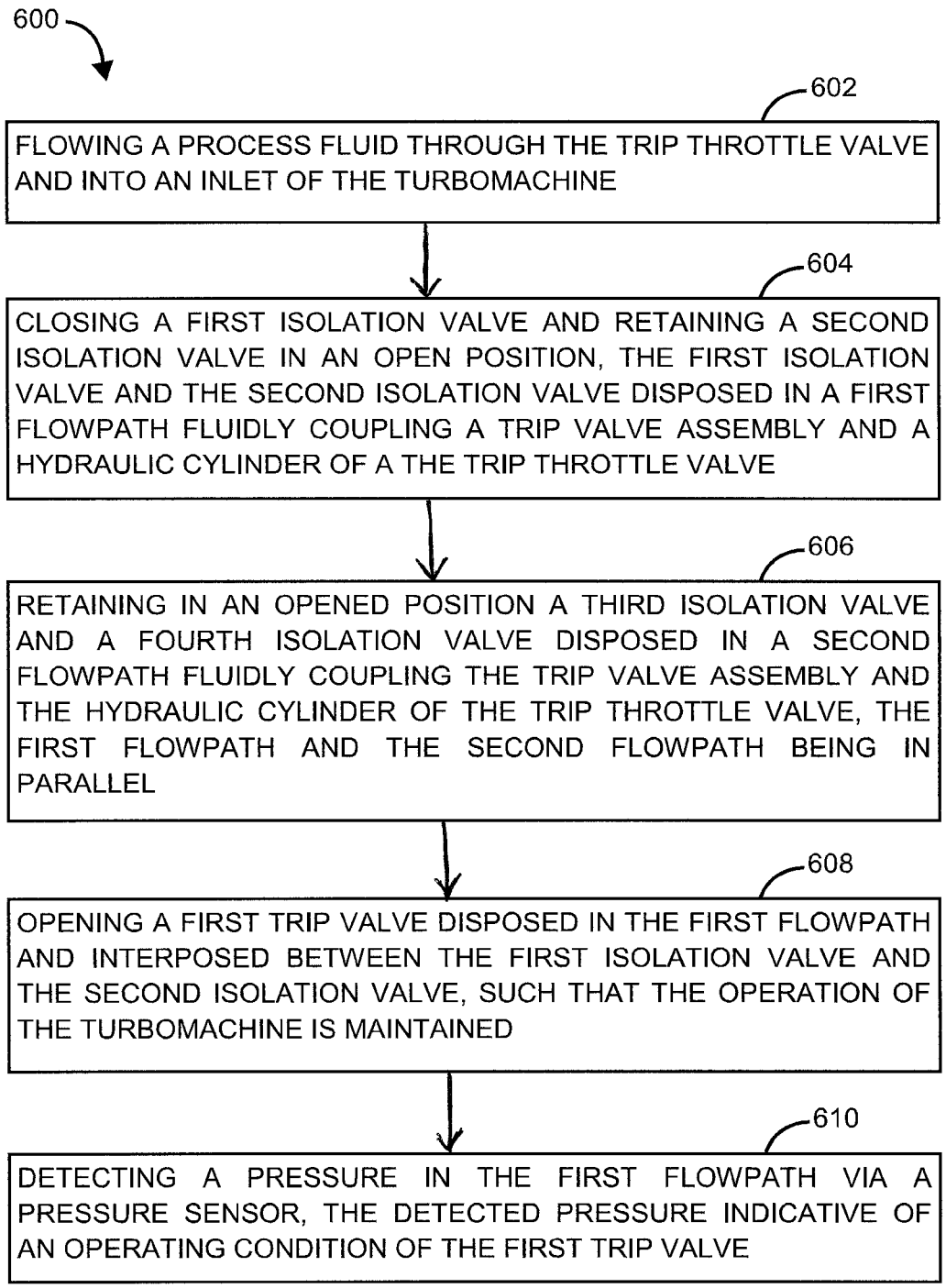
FIG. 6 is a flowchart depicting a method for testing a trip throttle valve during operation of a turbomachine, according to one or more embodiments of the disclosure.

FIG. 6 is a flowchart depicting another exemplary method 600 for testing a trip throttle valve during operation of a turbomachine, according to one or more embodiments of the disclosure. The method 600 may include flowing a process fluid through the trip throttle valve and into an inlet of the turbomachine, as at 602. The method 600 may also include closing a first isolation valve and retaining a second isolation valve in an open position, the first isolation valve and the second isolation valve disposed in a first flowpath fluidly coupling a trip valve assembly and a hydraulic cylinder of a the trip throttle valve, as at 604. The method 600 may further include retaining in an opened position a third isolation valve and a fourth isolation valve disposed in a second flowpath fluidly coupling the trip valve assembly and the hydraulic cylinder of a the trip throttle valve, the first flowpath and the second flowpath being in parallel, as at 606. The method 600 may also include opening a first trip valve disposed in the first flowpath and interposed between the first isolation valve and the second isolation valve, such that the operation of the turbomachine is maintained, as at 608. The method 600 may further include detecting a pressure in the first flowpath via a pressure sensor, the detected pressure indicative of an operating condition of the first trip valve, as at 610.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A trip throttle valve, comprising:
   a trip throttle valve inlet configured to receive a flow of process fluid from a process fluid source;
   a trip throttle valve outlet configured to fluidly communicate with a turbomachine; a throttle valve assembly defining a throttle valve chamber in fluid communication with the trip throttle valve inlet and the trip throttle valve outlet, the throttle valve assembly configured to control an amount of the process fluid flowing into the turbomachine, and the throttle valve assembly comprising
      a valve seat disposed within the throttle valve chamber;
      a valve head displaceable in the throttle valve chamber and configured in an open position to allow the process fluid to flow into the turbomachine and in a closed position to seat in the valve seat to prevent the process fluid from flowing into the turbomachine;
      a piston connected to the valve head via a valve stem;
      a biasing member disposed about the valve stem and configured to bias the piston in a first position such that the valve head is seated in the valve seat;
      a hydraulic cylinder configured to receive the piston and a hydraulic fluid therein; and
      an actuator assembly fluidly coupled with the hydraulic cylinder, the actuator assembly configured to transfer the hydraulic fluid to and from the hydraulic cylinder via a pressure differential across the piston; and
   a trip valve assembly configured to selectively remove hydraulic pressure from the hydraulic cylinder, the trip valve assembly comprising
      a plurality of trip valves fluidly coupled to the hydraulic cylinder via a first flow path and a second flow path, the plurality of trip valves comprising
         a first trip valve and a second trip valve arranged in fluid communication with a first pressure relief valve in the first flow path; and
         a third trip valve and a fourth trip valve arranged in fluid communication with a second pressure relief valve in the second flow path, the first flow path and the second flow path being in parallel with one another; and
      a plurality of isolation valves fluidly coupled to the hydraulic cylinder via the first flow path and the second flow path, the plurality of isolation valves comprising
         a first isolation valve and a second isolation valve arranged in the first flow path and configured to selectively prevent fluid communication between the first trip valve and the second trip valve and the hydraulic cylinder; and
         a third isolation valve and a fourth isolation valve arranged in the second flow path and configured to selectively prevent fluid communication between the third trip valve and the fourth trip valve and the hydraulic cylinder.

2. The trip throttle valve of claim 1, wherein one or more trip valves of the plurality of trip valves are pilot-to-close check valves.

3. The trip throttle valve of claim 1, wherein one or more isolation valves of the plurality of isolation valves are manually-operated valves.

4. The trip throttle valve of claim 1, wherein the actuator assembly further comprises a pump fluidly coupled to the hydraulic cylinder in a closed loop configuration and configured to circulate the hydraulic fluid in the closed loop configuration.

5. The trip throttle valve of claim 4, wherein the hydraulic cylinder defines a cylindrical chamber in which the piston is disposed, wherein the piston separates the cylindrical chamber into a first cylindrical chamber section and a second cylindrical chamber section.

6. The trip throttle valve of claim 5, wherein the pump is reversible such that the pump may supply hydraulic fluid to either the first cylinder chamber section or the second cylinder chamber section.

7. The trip throttle valve of claim 6, wherein the actuator assembly further comprises:
   a driver operatively coupled to the pump and configured to drive the pump in a first rotational direction to supply the hydraulic fluid to the first cylinder chamber section and a second rotational direction to supply the hydraulic fluid to the second cylinder chamber section; and a reservoir fluidly coupled to a suction side of the pump and configured to store additional hydraulic fluid.

8. The trip throttle valve of claim 1, wherein:

the biasing member is a spring disposed in a spring housing coupled to the hydraulic cylinder and compressible based on an amount of hydraulic fluid provided to the first cylinder chamber section; and the first pressure relief valve is fluidly coupled with a reservoir via a flow control orifice.

9. The trip throttle valve of claim 1, wherein the first pressure relief valve and the second pressure relief valve are in fluid communication with a reservoir.

* * * * *